US011346270B2

(12) United States Patent
Miura

(10) Patent No.: US 11,346,270 B2
(45) Date of Patent: May 31, 2022

(54) MUFFLER UNIT

(71) Applicant: HONDA MOTOR CO., LTD., Tokyo (JP)

(72) Inventor: Katsuki Miura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 656 days.

(21) Appl. No.: 16/262,182

(22) Filed: Jan. 30, 2019

(65) Prior Publication Data

US 2019/0249588 A1 Aug. 15, 2019

(30) Foreign Application Priority Data

Feb. 15, 2018 (JP) .............................. JP2018-024760

(51) Int. Cl.
F01N 1/02 (2006.01)
F01N 1/08 (2006.01)
(Continued)

(52) U.S. Cl.
CPC .............. F01N 13/04 (2013.01); B60K 13/06 (2013.01); F01N 1/02 (2013.01); F01N 1/026 (2013.01);
(Continued)

(58) Field of Classification Search
CPC ... F01N 1/00; F01N 1/02; F01N 1/026; F01N 1/08; F01N 1/089; F01N 13/00;
(Continued)

(56) References Cited

U.S. PATENT DOCUMENTS 3,419,892 A * 12/1968 Wagner .................. F02M 35/14
60/319
5,929,398 A * 7/1999 Amino .................... F01N 1/089
181/272

(Continued)

FOREIGN PATENT DOCUMENTS

DE 2840200 A1 11/1979
DE 20120470 U1 4/2003
(Continued)

OTHER PUBLICATIONS

Official Communication dated Jun. 19, 2019 issued over corresponding Japanese Patent Application No. 2018-024760.
(Continued)

Primary Examiner — Edgardo San Martin
(74) Attorney, Agent, or Firm — Carrier Blackman & Associates, P.C.; Joseph P. Carrier; William D. Blackman

(57) ABSTRACT

A muffler unit includes: an inner cylinder connected with a first exhaust pipe; a first outlet pipe that is connected with a downstream end of the inner cylinder and through which exhaust gas is discharged; an outer cylinder that houses thereinside the inner cylinder and defines, between the outer cylinder and an outer surface of the inner cylinder, an expansion chamber communicating with the second exhaust pipe; and a second outlet pipe that houses thereinside the first outlet pipe and defines, between the second outlet pipe and an outer surface of the first outlet pipe, a path connected with the expansion chamber to thereby be used for discharging the exhaust gas. Accordingly, there is provided the muffler unit having a size reduced compared with a configuration including two mufflers disposed in parallel with each other.

8 Claims, 5 Drawing Sheets

(51) Int. Cl.
*F01N 13/08* (2010.01)
*F01N 13/04* (2010.01)
*B60K 13/06* (2006.01)
*F01N 13/00* (2010.01)
*G10K 11/162* (2006.01)

(52) U.S. Cl.
CPC .......... *F01N 13/002* (2013.01); *G10K 11/162* (2013.01); *F01N 2390/00* (2013.01); *F01N 2470/00* (2013.01); *F01N 2470/02* (2013.01); *F01N 2470/08* (2013.01); *F01N 2470/14* (2013.01); *F01N 2470/16* (2013.01); *F01N 2470/24* (2013.01); *F01N 2590/04* (2013.01)

(58) Field of Classification Search
CPC ........ F01N 13/04; F01N 13/08; F01N 13/082; F01N 13/002; F01N 2470/16; F01N 2470/24; F01N 2470/14; F01N 2490/02; F01N 2490/04; F01N 2590/04; G10K 11/162
See application file for complete search history.

(56) References Cited

U.S. PATENT DOCUMENTS

| | | | |
|---|---|---|---|
| 10,823,022 B2* | 11/2020 | Soatti | F01N 1/08 |
| 10,907,525 B2* | 2/2021 | Muramatsu | F01N 1/168 |
| 2003/0115861 A1* | 6/2003 | Chang | F01N 1/006 |
| | | | 60/323 |
| 2006/0242952 A1* | 11/2006 | Muramatsu | F01N 1/084 |
| | | | 60/299 |
| 2011/0186373 A1 | 8/2011 | Mori et al. | |
| 2012/0273302 A1* | 11/2012 | Takagaki | F01N 1/02 |
| | | | 181/228 |
| 2017/0074132 A1* | 3/2017 | Nishioka | G10K 11/161 |
| 2019/0055866 A1* | 2/2019 | Kishikawa | F01N 1/06 |
| 2019/0226371 A1* | 7/2019 | Horr | G10K 11/162 |

FOREIGN PATENT DOCUMENTS

| | | |
|---|---|---|
| FR | 2388993 A1 | 11/1978 |
| JP | H02-101035 U | 8/1990 |
| JP | 2012-189023 A | 10/2012 |
| WO | 2017/159020 A1 | 9/2017 |

OTHER PUBLICATIONS

Extended European search report dated Apr. 8, 2019 issued in the corresponding EP Patent Application No. 19156565.4.

* cited by examiner

MUFFLER UNIT

BACKGROUND OF THE INVENTION

Field of the Invention

The present invention relates to a muffler unit including a muffler to which exhaust gas is supplied individually from a first exhaust pipe and a second exhaust pipe.

Description of the Related Art

Japanese Utility Model Application Laid-open No. 2-101035 discloses an exhaust muffler apparatus that includes a first muffler and a second muffler connected individually with a pair of bifurcated exhaust pipes that are bifurcated from a common exhaust pipe. A valve that opens or closes a flow path is disposed in the bifurcated exhaust pipe communicating with the second muffler. The valve is closed until a speed of an internal combustion engine reaches a predetermined speed, so that the exhaust gas is discharged from the first muffler only. Exhaust pressure builds up and reduction in an output from the internal combustion engine is prevented. When the speed of the internal combustion engine reaches the predetermined speed, the valve opens, so that the exhaust gas is discharged from both the first muffler and the second muffler. Effective sound deadening depending on the speed of the internal combustion engine can thus be achieved.

However, the configuration disclosed in Japanese Utility Model Application Laid-open No. 2-101035 leads to an increase in size of the exhaust muffler apparatus as a whole because of the two mufflers disposed in parallel with each other.

SUMMARY OF THE INVENTION

The present invention has been made in view of the foregoing situation and it is an object of the present invention to provide a muffler unit having a size reduced compared with the configuration including two mufflers disposed in parallel with each other.

In order to achieve the object, according to a first aspect of the present invention, there is provided a muffler unit comprising a muffler to which exhaust gas is supplied individually from a first exhaust pipe and a second exhaust pipe, the muffler unit further comprising: an inner cylinder connected with the first exhaust pipe; a first outlet pipe that is connected with a downstream end of the inner cylinder and through which the exhaust gas is discharged; an outer cylinder that houses thereinside the inner cylinder and defines, between the outer cylinder and an outer surface of the inner cylinder, an expansion chamber communicating with the second exhaust pipe; and a second outlet pipe that houses thereinside the first outlet pipe and defines, between the second outlet pipe and an outer surface of the first outlet pipe, a path connected with the expansion chamber to thereby be used for discharging the exhaust gas.

According to the first aspect, the expansion chamber that communicate with the second exhaust pipe is formed between the inner cylinder and the outer cylinder. The muffler can thus be built compactly compared with a configuration in which two cylinders defining respective expansion chambers are disposed in juxtaposition with each other. The expansion chamber that communicates with the second exhaust pipe is connected with the path defined between the outer surface of the first outlet pipe and the second outlet pipe. The space required for disposing the outlet pipes can thus be reduced compared with a configuration in which two outlet cylinders are disposed in juxtaposition with each other.

According to a second aspect of the present invention, in addition to the first aspect, the second outlet pipe has a recess formed therein, the recess being indented toward the first outlet pipe inside the second outlet pipe, and the recess is connected with an outer periphery of the first outlet pipe.

According to the second aspect, because the recesses in the second outlet pipe are received by the outer periphery of the first outlet pipe, a space is available between the second outlet pipe and the first outlet pipe at places other than the recesses. The space forms the path that is connected with the expansion chamber and used for discharging the exhaust gas. A discharge path having a dual structure is thus formed through a simple structure.

According to a third aspect of the present invention, in addition to the second aspect, as said recess, a plurality of recesses are provided in a peripheral direction of the second outlet pipe.

According to the third aspect, the space expands uniformly in the peripheral direction of the second outlet pipe between the second outlet pipe and the first outlet pipe. Thus, the path connected with the expansion chamber and used for discharging the exhaust gas is formed uniformly in the peripheral direction of the second outlet pipe.

According to a fourth aspect of the present invention, in addition to the second or third aspect, the recesses are disposed inside the expansion chamber.

According to the fourth aspect, because the outer periphery of the second outlet pipe partitions the expansion chamber, the recesses can increase a volume of the expansion chamber.

According to a fifth aspect of the present invention, in addition to any one of the first to third aspects, there is provided the muffler unit, further comprising: a partition wall disposed between the second outlet pipe and the outer cylinder, the partition wall isolating the outer cylinder from the expansion chamber.

According to the fifth aspect, the outer cylinder is isolated from the expansion chamber, while the expansion chamber is provided in the space in contact with the outer periphery of the second outlet pipe. Heat to be transmitted to the outer cylinder can thus be reduced.

According to a sixth aspect of the present invention, in addition to any one of the first to third aspects, the inner cylinder is formed of a linear cylindrical pipe, and the first outlet pipe is formed of a curved pipe connected with a downstream end of the cylindrical pipe and curved in a direction in which the exhaust gas flows.

According to the sixth aspect, the linear cylindrical pipe and the curved pipe fitted to the cylindrical pipe constitute a flow path for the exhaust gas supplied from the first exhaust pipe, so that the muffler unit can be manufactured more easily compared with a configuration in which the flow path is formed of a single pipe.

According to a seventh aspect of the present invention, in addition to the sixth aspect, the outer cylinder includes: an outer cylinder main body that supports the inner cylinder; and a tail end body that is coupled with a downstream end of the outer cylinder main body and supports the first outlet pipe and the second outlet pipe.

According to the seventh aspect, the muffler unit can be easily manufactured, because the tail end body, with which the first outlet pipe and the second outlet pipe have been assembled, has only to be coupled with the outer cylinder main body.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will be described below with reference to the accompanying drawings. Throughout the descriptions given hereunder, expressions indicating directions including up, down, front, rear, left, and right of the vehicle body are defined on the basis of eye-level of an occupant who rides in a two-wheeled motor vehicle.

Figure 1:
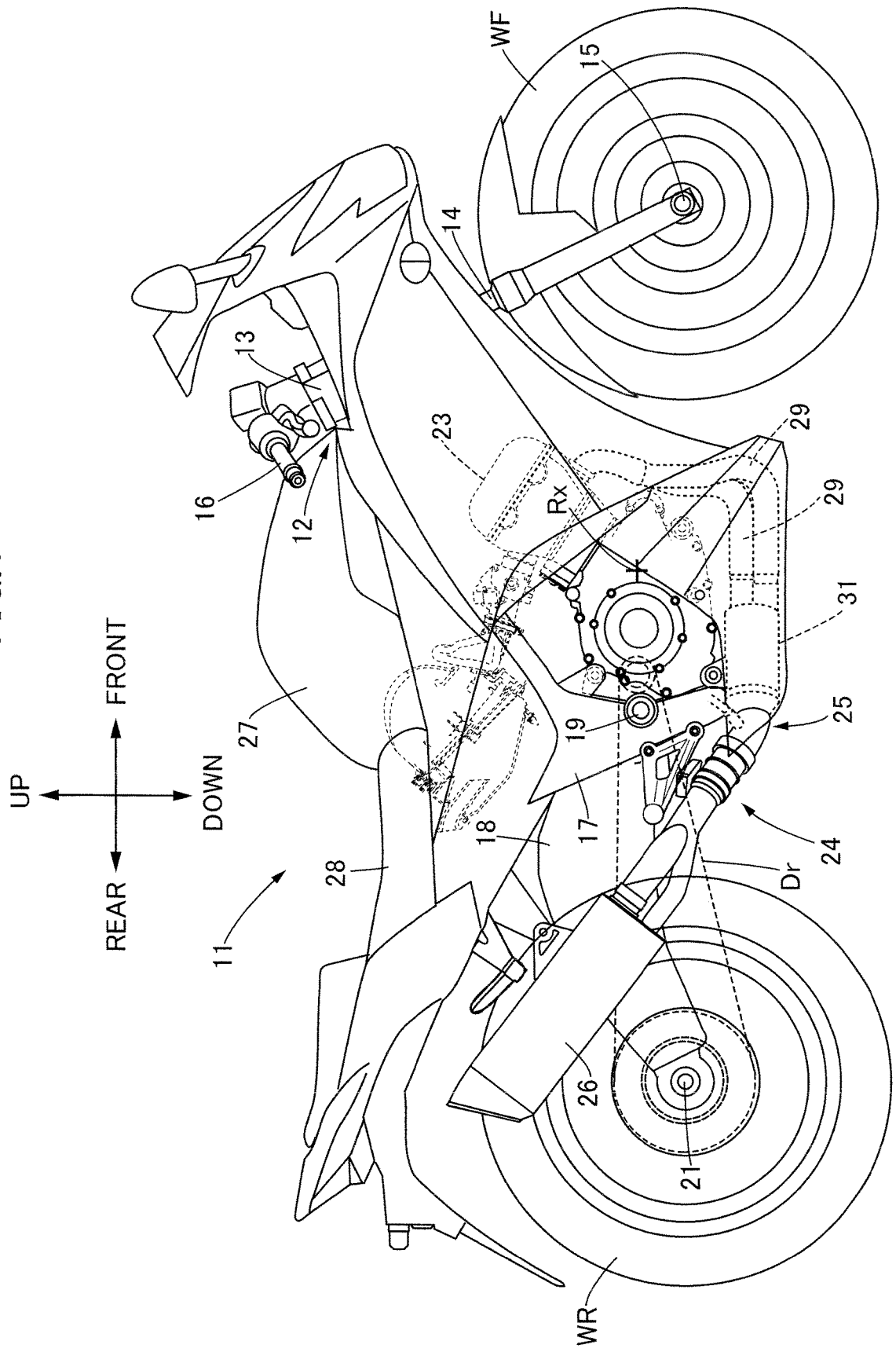
FIG. 1 is a side view depicting a whole configuration of a two-wheeled motor vehicle.

FIG. 1 schematically depicts a whole configuration of a two-wheeled motor vehicle according to an embodiment of the present invention. A two-wheeled motor vehicle 11 includes a vehicle body frame 12. A front fork 14 is steerably supported on a head pipe 13 at a front end of the vehicle body frame 12. A front wheel WF is supported on the front fork 14 rotatably about an axle 15. A handlebar 16 is coupled with the front fork 14 at an upper side of the head pipe 13. A swing arm 18 is supported on a pivot frame 17 at a rear side of the vehicle body frame 12 swingably about a pivot 19, which extends horizontally in a vehicle width direction. A rear wheel WR is supported at a rear end of the swing arm 18 rotatably about an axle 21.

An internal combustion engine 23 is mounted on the vehicle body frame 12 between the front wheel WF and the rear wheel WR. The internal combustion engine 23 produces power about a rotational axis Rx. The power produced by the internal combustion engine 23 is transmitted to the rear wheel WR by way of a power transmission device Dr. The descriptions given hereunder may omit describing configurations identical to configurations found in well-known internal combustion engines.

An exhaust system 24 is connected with the internal combustion engine 23. The exhaust system 24 discharges exhaust gas from the internal combustion engine 23 to the rear of the vehicle body, while performing a purification function and a sound-deadening function. The exhaust system 24 includes an exhaust pipe unit 25 and a muffler unit 26. The exhaust pipe unit 25 has an upstream end connected with an exhaust path of the internal combustion engine 23 for each cylinder and extends below the internal combustion engine 23 toward the rear. The muffler unit 26 is connected with a downstream end of the exhaust pipe unit 25 at a position in front of the rear wheel WR and below the swing arm 18 and has an exhaust port disposed at a position higher in level than the axle 21 and beside the rear wheel WR. The muffler unit 26 performs a sound-deadening function of the internal combustion engine 23. The exhaust gas of the internal combustion engine 23 is discharged from the exhaust port of the muffler unit 26 toward the rear.

A fuel tank 27 is mounted on the vehicle body frame 12 at a position above the internal combustion engine 23. An occupant seat 28 is mounted on the vehicle body frame 12 at a position behind the fuel tank 27. Fuel is supplied from the fuel tank 27 to a fuel injection device (not depicted) of the internal combustion engine 23. When operating the two-wheeled motor vehicle 11, the occupant straddles the occupant seat 28.

Figure 2:
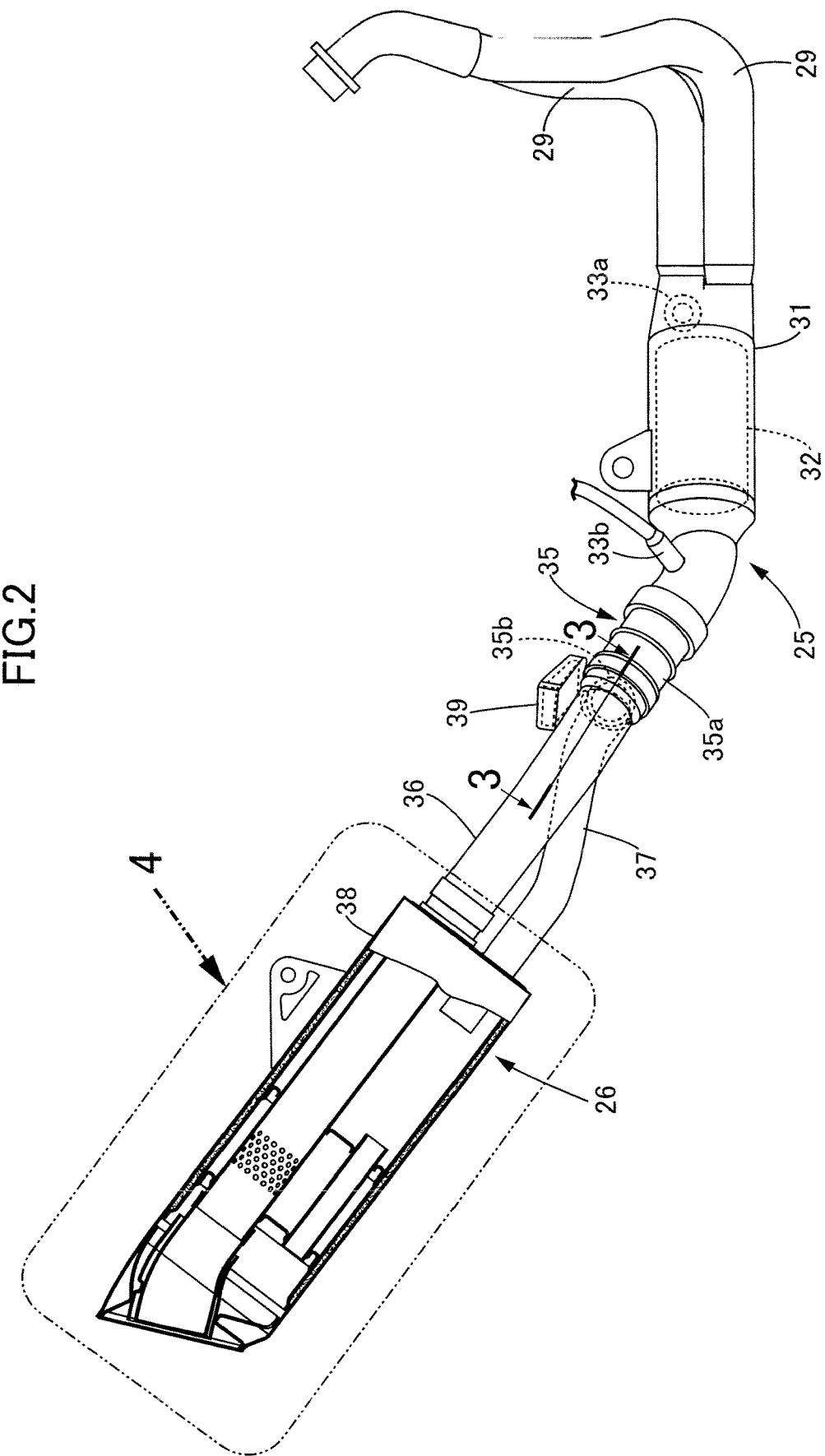
FIG. 2 is an enlarged side view schematically depicting a structure of an exhaust system.

Reference is made to FIG. 2. The exhaust pipe unit 25 includes individual exhaust pipes 29 and a collective exhaust pipe 31. The individual exhaust pipes 29 each have an upstream end connected with a cylinder head of the internal combustion engine 23 for each cylinder. The collective exhaust pipe 31 has an upstream end connected with commonly the downstream end of the individual exhaust pipes 29 and a downstream end connected with the upstream end of the muffler unit 26. The collective exhaust pipe 31 forms an exhaust gas flow path communicating with the internal combustion engine 23. As depicted in FIG. 1, the individual exhaust pipes 29 extend from a front wall of the cylinder head downwardly and are bent at a specific ground height toward the rear. The collective exhaust pipe 31 extends along a path at a specific ground height below the internal combustion engine 23 toward the rear. The collective exhaust pipe 31 is then curved to the right of the vehicle body at a position in front of the rear wheel WR and extends upwardly toward the muffler unit 26.

The collective exhaust pipe 31 houses a catalyzer unit 32. The catalyzer unit 32 purifies exhaust gas. A first oxygen sensor 33$a$ and a second oxygen sensor 33$b$ are disposed upstream and downstream, respectively, of the catalyzer unit 32 in an exhaust gas flow direction. The first oxygen sensor 33$a$ and the second oxygen sensor 33$b$ each measure oxygen concentration in the exhaust gas.

The muffler unit 26 includes a branch joint 35, a first exhaust pipe 36, a second exhaust pipe 37, and a muffler 38. The branch joint 35 includes a main pipe 35$a$ and a branch pipe 35$b$. The main pipe 35$a$ is connected with a downstream end of the collective exhaust pipe 31 in series with the collective exhaust pipe 31. The branch pipe 35$b$ is bifurcated from the main pipe 35$a$ in a direction orthogonal to an extension of the collective exhaust pipe 31. The first exhaust pipe 36 is connected with a downstream end of the main pipe 35$a$ of the branch joint 35 in series with the main pipe 35$a$ of the branch joint 35. The second exhaust pipe 37 is connected with the branch pipe 35$b$ of the branch joint 35 and formed to have a diameter smaller than a diameter of the first exhaust pipe 36. The muffler 38 is connected with the first exhaust pipe 36 and the second exhaust pipe 37. The second exhaust pipe 37 has a sectional area smaller than a sectional area of the first exhaust pipe 36 in a section orthogonal to the exhaust gas flow direction.

An open/close valve 39 is built into the branch joint 35. The open/close valve 39 is located downstream of the branch pipe 35$b$ and inside the main pipe 35$a$. The open/close valve 39 opens or closes a path inside the main pipe 35$a$ depending on the speed of the internal combustion engine 23. The open/close valve 39 is operated on an electric signal supplied from a control circuit not depicted.

Figure 3:
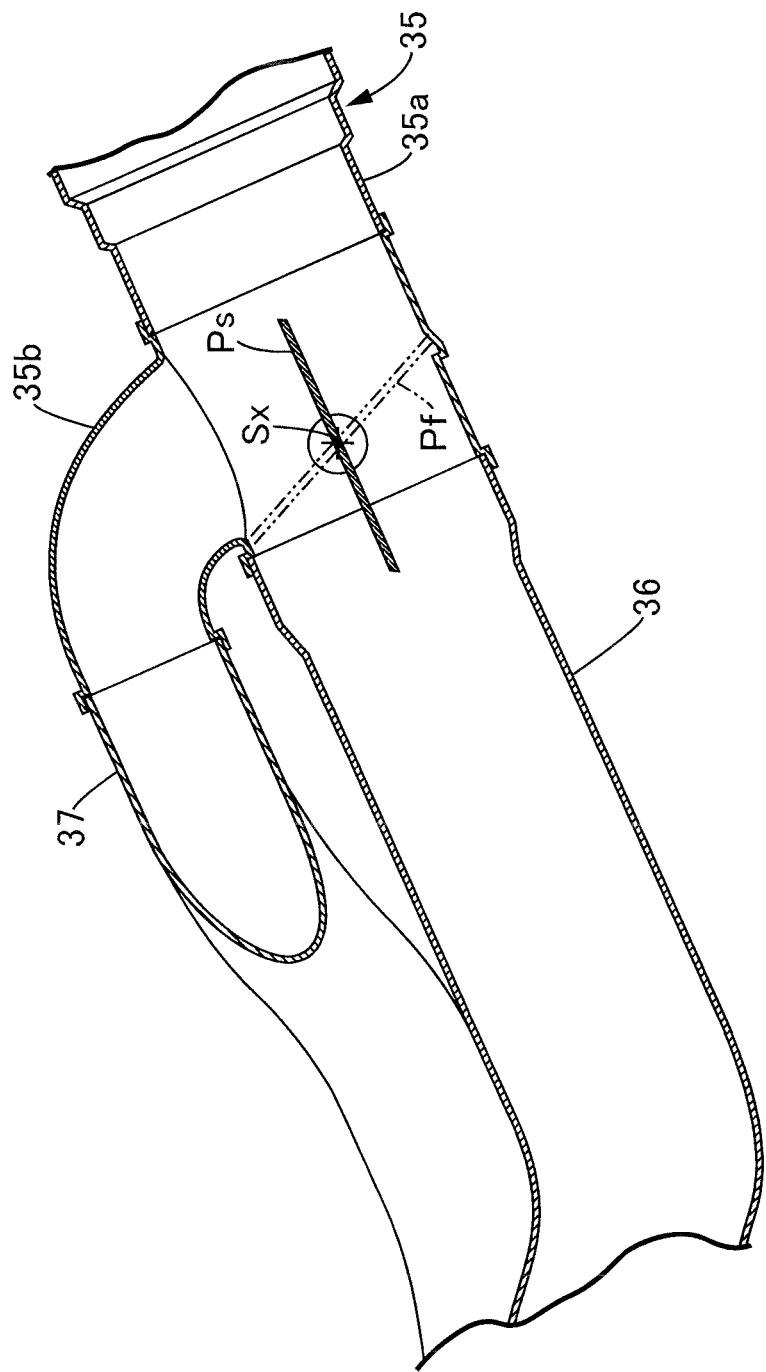
FIG. 3 is an enlarged sectional view taken along line 3-3 in FIG. 2.

Reference is made to FIG. 3. The open/close valve 39 is configured with a butterfly valve that rotates about a rotational axis Sx between a first position Pf and a second position Ps. At the first position Pf, the open/close valve 39 fully closes the path inside the main pipe 35$a$ to thereby guide exhaust gas flowing from the collective exhaust pipe 31, toward the second exhaust pipe 37 by way of the branch pipe 35b. At the second position Ps, the open/close valve 39 fully opens the path inside the main pipe 35a to thereby guide the exhaust gas flowing from the collective exhaust pipe 31, toward the first exhaust pipe 36. When the internal combustion engine 23 operates in a low speed range in which the internal combustion engine 23 delivers a speed lower than a predetermined speed, the open/close valve 39 is placed in the first position Pf to thereby close the main pipe 35a, so that the exhaust gas flows into the second exhaust pipe 37 by way of the branch pipe 35b. When the internal combustion engine 23 operates in a high speed range in which the internal combustion engine 23 delivers a speed equal to or higher than the predetermined speed, the open/close valve 39 is placed in the second position Ps to thereby open the main pipe 35a, so that the exhaust gas flows from the main pipe 35a into the first exhaust pipe 36 and, by way of the branch pipe 35b, into the second exhaust pipe 37.

Figure 4:
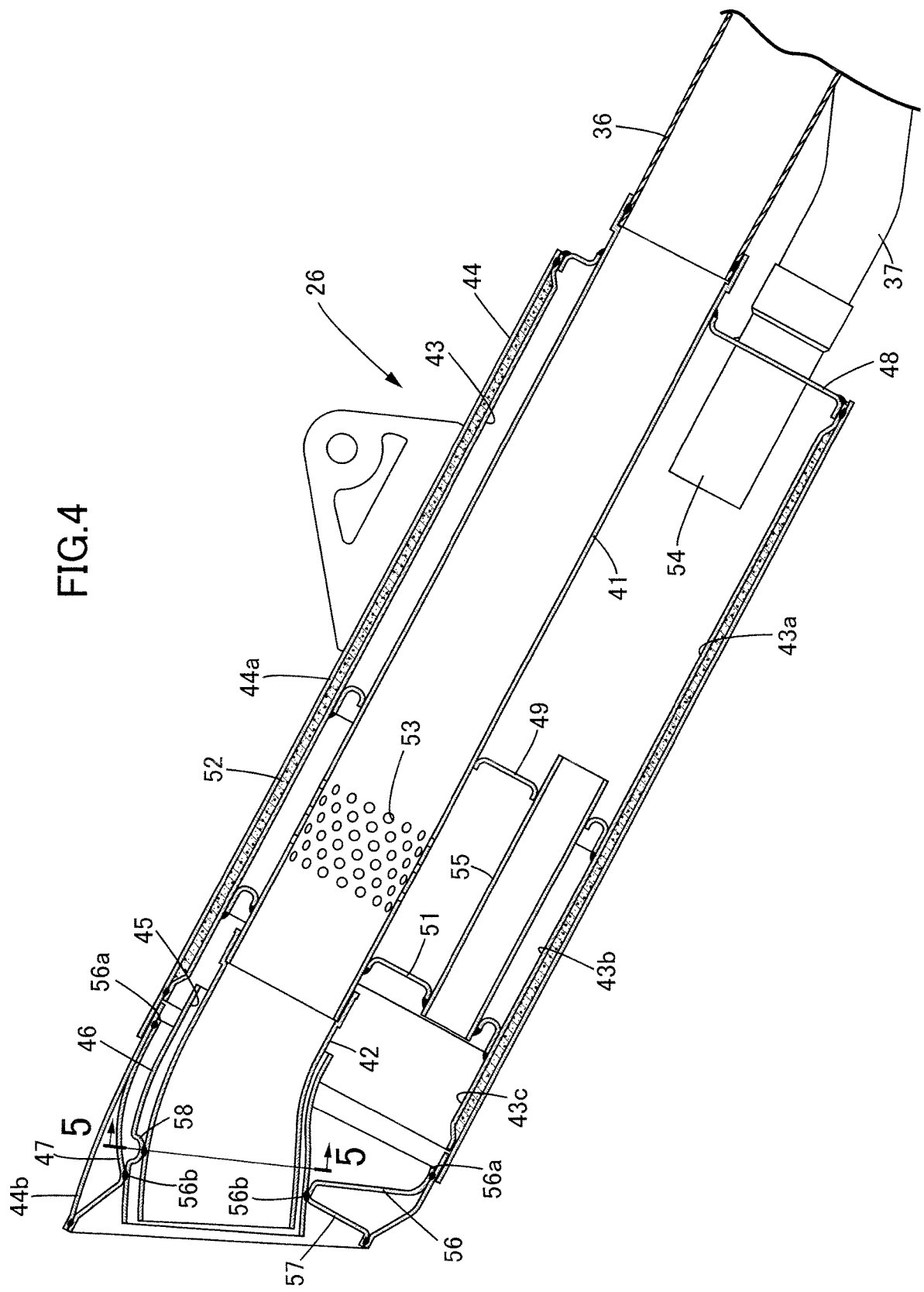
FIG. 4 is an enlarged sectional view of a muffler.

Reference is made to FIG. 4. The muffler 38 includes an inner cylinder 41, a first outlet pipe 42, an outer cylinder 44, a second outlet pipe 46, and a partition wall 47. The inner cylinder 41 is formed of a linear cylindrical pipe extending in an axial direction and has an upstream end connected with the first exhaust pipe 36. The first outlet pipe 42 is formed of a curved pipe connected with a downstream end of the inner cylinder 41 and curved in the exhaust gas flow direction. The outer cylinder 44 extends in the axial direction of the inner cylinder 41 to thereby house thereinside the inner cylinder 41 and the first outlet pipe 42. The outer cylinder 44 further defines an inner space 43 between the outer cylinder 44 and an outer surface of the inner cylinder 41 and an outer surface of the first outlet pipe 42. The inner space 43 is isolated from a flow path that communicates with the first exhaust pipe 36. The second outlet pipe 46 curves to extend in the same direction as the first outlet pipe 42 to thereby house thereinside the first outlet pipe 42. The second outlet pipe 46 defines a path 45 connected with the inner space 43 between the second outlet pipe 46 and the outer surface of the first outlet pipe 42. The partition wall 47 is disposed between the second outlet pipe 46 and the outer cylinder 44 to thereby isolate the outer cylinder 44 from the inner space 43.

The outer cylinder 44 includes an outer cylinder main body 44a, and a tail end body 44b. The outer cylinder main body 44a supports the inner cylinder 41 with an end plate 48, a first bulkhead 49 and a second bulkhead 51 which are fixed in sequence from the upstream side in the exhaust gas flow direction and partition the inner space 43. The tail end body 44b is coupled with a downstream end of the outer cylinder main body 44a and supports the first outlet pipe 42 and the second outlet pipe 46. The outer cylinder main body 44a is configured with a dual cylinder formed of metal thin plates sandwiching glass wool 52. The tail end body 44b is formed from a metal thin plate. The tail end body 44b is fitted in an inside of a single cylinder that constitutes the downstream end of the outer cylinder main body 44a. The first outlet pipe 42 has an upstream end fitted to the downstream end of the inner cylinder 41.

The end plate 48, the first bulkhead 49, and the second bulkhead 51 are joined airtightly with an inner peripheral surface of the outer cylinder 44 throughout an entire periphery in a peripheral direction around an axis, and joined airtightly with an outer peripheral surface of the inner cylinder 41 throughout an entire periphery in a peripheral direction around an axis. The joining is achieved by, for example, welding. The end plate 48 and the first bulkhead 49 partition the inner space 43 of the outer cylinder 44 into a first expansion chamber 43a. The first bulkhead 49 and the second bulkhead 51 partition the inner space 43 of the outer cylinder 44 into a second expansion chamber 43b. The second bulkhead 51 and the partition wall 47 partition the inner space 43 into a third expansion chamber 43c. The second outlet pipe 46 has an upstream end facing the third expansion chamber 43c.

The inner cylinder 41 has a plurality of small holes 53 formed therein. The small holes 53 provide communication between the inside and the outside of the inner cylinder 41 within the second expansion chamber 43b. Exhaust gas that flows in from the first exhaust pipe 36 flows to and from the second expansion chamber 43b through the small holes 53 before being discharged via the first outlet pipe 42 to an outside.

An introduction pipe 54 is fixed to the end plate 48. The introduction pipe 54 is formed of a linear cylindrical pipe extending in the axial direction in parallel with the inner cylinder 41. The introduction pipe 54 has an upstream end fitted in the second exhaust pipe 37 and a downstream end facing the first expansion chamber 43a. A connection pipe 55 is fixed to the first bulkhead 49 and the second bulkhead 51. The connection pipe 55 is formed of a linear cylindrical pipe extending in the axial direction in parallel with the inner cylinder 41. The connection pipe 55 has an upstream end facing the first expansion chamber 43a and a downstream end facing the third expansion chamber 43c. The connection pipe 55 is formed to have a diameter smaller than a diameter of the introduction pipe 54 and traverses the second expansion chamber 43b. Exhaust gas that flows from the second exhaust pipe 37 passes through the first expansion chamber 43a and the third expansion chamber 43c and is discharged to the outside via the path 45 defined between the first outlet pipe 42 and the second outlet pipe 46.

The partition wall 47 includes a reduced-diameter portion 56 and an enlarged-diameter portion 57. The reduced-diameter portion 56 has an upstream end 56a joined with an inner surface of the tail end body 44b on an upstream end of the tail end body 44b. The reduced-diameter portion 56 extends, while reducing a diameter thereof, from the upstream end 56a toward a downstream end of the second outlet pipe 46 and is joined with an outer peripheral surface of the second outlet pipe 46 at a downstream end 56b. The enlarged-diameter portion 57 is continuous from the downstream end 56b of the reduced-diameter portion 56 and extends, while increasing the diameter thereof, toward a downstream end of the tail end body 44b. The enlarged-diameter portion 57 has a downstream end joined with the inner surface of the tail end body 44b at the downstream end of the tail end body 44b. The joining is achieved by, for example, welding. The upstream end 56a of the reduced-diameter portion 56 is joined airtightly with the inner surface of the tail end body 44b throughout an entire periphery thereof. The downstream end 56b of the reduced-diameter portion 56 is airtightly joined with the outer peripheral surface of the second outlet pipe 46. The reduced-diameter portion 56 defines a space continuous from the third expansion chamber 43c, between the reduced-diameter portion 56 and the second outlet pipe 46. Thus, the space partitioned by the partition wall 47 inside the tail end body 44b constitutes a part of the third expansion chamber 43c.

Figure 5:
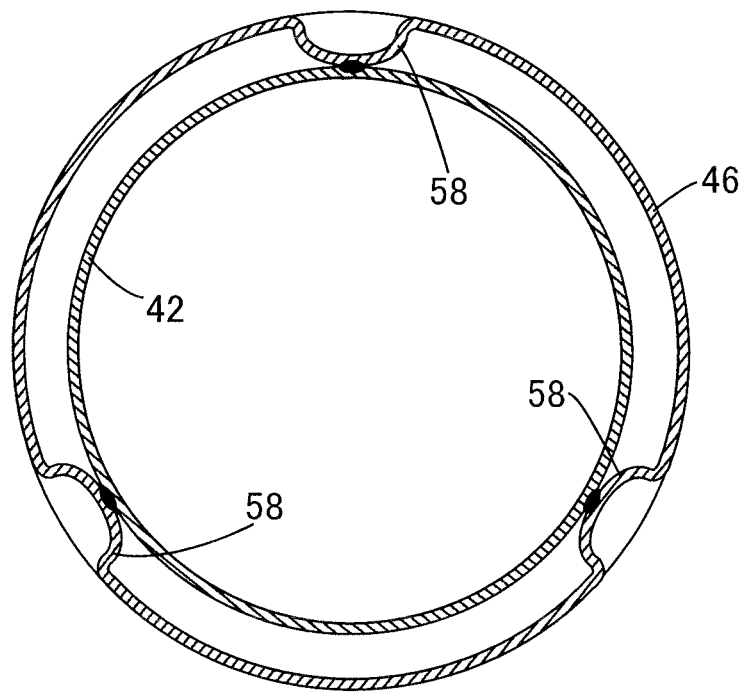
FIG. 5 is an enlarged sectional view taken along line 5-5 in FIG. 4.

The second outlet pipe 46 has a recess 58 formed in a pipe wall thereof. The recess 58 is indented toward the first outlet pipe 42 inside the second outlet pipe 46. The recess 58 is connected with an outer periphery of the first outlet pipe 42. The recess 58 is, for example, welded to the first outlet pipe 42. A space is available between the second outlet pipe 46 and the first outlet pipe 42 at places other than the recess 58. Because the recess 58 is formed in plurality (e.g., three at intervals of, for example, a central angle of 120 degrees) in the peripheral direction of the second outlet pipe 46 as depicted in FIG. 5, contact between the first outlet pipe 42 and the second outlet pipe 46 is reliably avoided throughout the entire periphery at places other than the recesses 58.

As depicted in FIG. 4, the recesses 58 are disposed upstream of the downstream end 56b of the reduced-diameter portion 56. Thus, the recesses 58 are disposed inside the third expansion chamber 43c. A space inside the recesses 58 is continuous from a space of the third expansion chamber 43c.

Operation of the exhaust system 24 in the embodiment will be described below. When the internal combustion engine 23 performs an intake stroke, a compression stroke, a combustion stroke, and an exhaust stroke, a piston makes linear reciprocating motion on the basis of combustion of an air-fuel mixture introduced into a combustion chamber. The linear reciprocating motion of the piston induces rotary motion of a crankshaft about the rotational axis Rx. Exhaust gas of the air-fuel mixture burned in the combustion chamber flows from the exhaust path of the internal combustion engine 23 into the exhaust system 24 and is discharged to the rear by way of the exhaust pipe unit 25 and the muffler unit 26. The catalyzer unit 32 in the exhaust pipe unit 25 purifies the exhaust gas.

When the internal combustion engine 23 operates in the low speed range to deliver a speed lower than the predetermined speed, the open/close valve 39 closes the main pipe 35a at a position downstream of the branch pipe 35b, so that the exhaust gas flows into the second exhaust pipe 37 by way of the branch pipe 35b. A small flow rate is set for the second exhaust pipe 37 compared with a flow rate for the first exhaust pipe 36. Thus, exhaust pressure builds up and reduction in an output from the internal combustion engine 23 is prevented. In the muffler unit 26, the exhaust gas is introduced from the introduction pipe 54 to the first expansion chamber 43a. The exhaust gas is expanded in the first expansion chamber 43a, flows from the first expansion chamber 43a into the third expansion chamber 43c via the connection pipe 55, and is expanded in the third expansion chamber 43c. Effective sound deadening can thus be achieved in the low speed range of the internal combustion engine 23.

When the internal combustion engine 23 operates in the high speed range to deliver a speed equal to or higher than the predetermined speed, the open/close valve 39 opens the main pipe 35a, so that the exhaust gas flows from the main pipe 35a into the first exhaust pipe 36 and, via the branch pipe 35b, into the second exhaust pipe 37. The flow rate of the exhaust gas increases at a rate permissible corresponding to the operation in the high speed range. In the muffler unit 26, the exhaust gas flows in and out of the inner cylinder 41 and the second expansion chamber 43b through the small holes 53. The exhaust gas is discharged to the outside from the first outlet pipe 42. Effective sound deadening depending on the high speed range of the internal combustion engine 23 can thus be achieved.

In accordance with the muffler unit 26 in the embodiment, the first expansion chamber 43a and the third expansion chamber 43c that communicate with the second exhaust pipe 37 are formed between the inner cylinder 41 and the outer cylinder 44. The muffler 38 can thus be built compactly compared with a configuration in which two cylinders defining respective expansion chambers are disposed in juxtaposition with each other. The first expansion chamber 43a and the third expansion chamber 43c that communicate with the second exhaust pipe 37 are connected with the path 45 defined between the outer surface of the first outlet pipe 42 and the second outlet pipe 46. The space required for disposing the outlet pipes can thus be reduced compared with a configuration in which two outlet cylinders are disposed in juxtaposition with each other.

In the embodiment, because the recesses 58 in the outer second outlet pipe 46 are received by the outer periphery of the first outlet pipe 42, a space is available between the second outlet pipe 46 and the first outlet pipe 42 at places other than the recesses 58. The space forms the path 45 that is connected with the third expansion chamber 43c and used for discharging the exhaust gas. A discharge path having a dual structure is thus formed through a simple structure. Because the recesses 58 are formed in plurality in the peripheral direction of the second outlet pipe 46 as described previously, the space expands uniformly in the peripheral direction of the second outlet pipe 46 between the second outlet pipe 46 and the first outlet pipe 42. Thus, the path 45 is formed uniformly in the peripheral direction of the second outlet pipe 46.

The recesses 58 are disposed inside the third expansion chamber 43c. That is, the space inside the recesses 58 is continuous from the space in the third expansion chamber 43c as described previously. The recesses 58 thereby increase a volume of the third expansion chamber 43c.

In the muffler 38 in the embodiment, the partition wall 47, which isolates the outer cylinder 44 from the third expansion chamber 43c, is disposed between the second outlet pipe 46 and the outer cylinder 44. On the outer periphery of the second outlet pipe 46, the outer cylinder 44 is isolated from the third expansion chamber 43c, while the reduced-diameter portion 56 of the partition wall 47 provides the third expansion chamber 43c, so that heat to be transmitted to the outer cylinder 44 is reduced.

In the embodiment, while the inner cylinder 41 is formed of a linear cylindrical pipe, the first outlet pipe 42 is formed of a curved pipe curved in the exhaust gas flow direction. The first outlet pipe 42 as the curved pipe is fitted to the downstream end of the inner cylinder 41 as the cylindrical pipe. Thus, the linear cylindrical pipe and the curved pipe fitted to the cylindrical pipe constitute a flow path for the exhaust gas supplied from the first exhaust pipe 36, so that the muffler 38 can be manufactured easily compared with a configuration in which the flow path is formed of a single pipe.

The outer cylinder 44 includes the outer cylinder main body 44a, which supports the inner cylinder 41, and the tail end body 44b, which is coupled with the downstream end of the outer cylinder main body 44a and supports the first outlet pipe 42 and the second outlet pipe 46. The muffler 38 can be easily manufactured, because the tail end body 44b, with which the first outlet pipe 42 and the second outlet pipe 46 have been assembled, has only to be coupled with the outer cylinder main body 44a.

When the muffler 38 is to be assembled, the end plate 48, the first bulkhead 49, and the second bulkhead 51 are fixed to the inner cylinder 41. The introduction pipe 54 is fixed to the end plate 48. The connection pipe 55 is fixed to the first bulkhead 49 and the second bulkhead 51. The fixing of each of the foregoing parts is achieved by, for example, welding.

An inner cylindrical body of the outer cylinder main body 44a is next prepared. The first bulkhead 49 and the second bulkhead 51 that have been fixed to the inner cylinder 41 are then inserted in the cylindrical body. The insertion of the inner cylinder 41, the first bulkhead 49, and the second bulkhead 51 in the inner cylindrical body prior to assembly of the outer cylinder main body 44a enables welding to be performed between the cylindrical body and the end plate 48, the first bulkhead 49, and the second bulkhead 51 from an outside of the cylindrical body. Thereafter, the glass wool 52 is wound around the cylindrical body, and then an outer cylindrical body of the outer cylinder main body 44a is mounted on the inner cylindrical body. The outer cylindrical body is welded to the inner cylindrical body to manufacture the outer cylinder main body 44a.

Similarly, the first outlet pipe 42 and the second outlet pipe 46 are prepared. The recesses 58 are formed in the second outlet pipe 46 in advance. The first outlet pipe 42 is inserted into the second outlet pipe 46. The recesses 58 contact the outer periphery of the first outlet pipe 42. The recesses 58 are welded onto the outer periphery of the first outlet pipe 42. At this time, the welding can be performed from the outside of the second outlet pipe 46. The first outlet pipe 42 and the second outlet pipe 46, which are fixed to each other, are then inserted inside the partition wall 47. The downstream end 56b of the reduced-diameter portion 56 is welded to the outer periphery of the second outlet pipe 46. The first outlet pipe 42, the second outlet pipe 46, and the partition wall 47, which have been assembled with each other as described above, are inserted in the tail end body 44b of the outer cylinder 44. The tail end body 44b is welded to the outer periphery of the partition wall 47 at the upstream end and the downstream end thereof. The first outlet pipe 42, the second outlet pipe 46, and the partition wall 47 are thereby assembled in the tail end body 44b.

The tail end body 44b is thereafter fitted in the downstream end of the outer cylinder main body 44a. At this time, the downstream of the inner cylinder 41 is inserted in the upstream end of the first outlet pipe 42. As such, the tail end body 44b has only to be coupled with the outer cylinder main body 44a after the first outlet pipe 42, the second outlet pipe 46, and the partition wall 47 have been assembled in the tail end body 44b. The muffler 38 can thus be manufactured easily. The inner cylinder 41 has the upstream end protruding from the end plate 48 to the front and the introduction pipe 54 has the upstream end protruding from the end plate 48 to the front. Thus, the muffler unit 26 can be manufactured easily by inserting the first exhaust pipe 36 in the upstream end of the inner cylinder 41 and inserting the second exhaust pipe 37 in the upstream end of the introduction pipe 54.

What is claimed is:

1. A muffler unit comprising a muffler to which exhaust gas is supplied individually from a first exhaust pipe and a second exhaust pipe, the muffler unit further comprising:
   an inner cylinder connected with the first exhaust pipe;
   a first outlet pipe that is connected with a downstream end of the inner cylinder and through which the exhaust gas is discharged;
   an outer cylinder that houses thereinside the inner cylinder and defines, between the outer cylinder and an outer surface of the inner cylinder, an expansion chamber communicating with the second exhaust pipe;
   a second outlet pipe that houses thereinside the first outlet pipe and defines, between the second outlet pipe and an outer surface of the first outlet pipe, a path connected with the expansion chamber to thereby be used for discharging the exhaust gas; and
   a partition wall,
   wherein the outer cylinder includes:
      an outer cylinder main body that supports the inner cylinder; and
      a tail end body that is coupled with a downstream end of the outer cylinder main body and supports the first outlet pipe and the second outlet pipe, and
   wherein the partition wall includes a reduced-diameter portion and an enlarged-diameter portion, the reduced-diameter portion has an upstream end joined with an inner surface of the tail end body on an upstream end of the tail end body, the reduced-diameter portion extending, while reducing a diameter thereof, from the upstream end toward a downstream end of the second outlet pipe and being joined with an outer peripheral surface of the second outlet pipe at a downstream end whereas the enlarged-diameter portion is continuous from the downstream end of the reduced-diameter portion and extends, while increasing the diameter thereof, toward a downstream end of the tail end body, the enlarged-diameter portion having a downstream end joined with the inner surface of the tail end body at the downstream end of the tail end body.

2. The muffler unit according to claim 1, wherein the second outlet pipe has a recess formed therein, the recess being indented toward the first outlet pipe inside the second outlet pipe, and
the recess is connected with an outer periphery of the first outlet pipe.

3. The muffler unit according to claim 2, wherein as said recess, a plurality of recesses are provided in a peripheral direction of the second outlet pipe.

4. The muffler unit according to claim 2, wherein the recesses are disposed inside the expansion chamber.

5. The muffler unit according to claim 1, wherein the inner cylinder is formed of a linear cylindrical pipe, and
the first outlet pipe is formed of a curved pipe connected with a downstream end of the linear cylindrical pipe and curved in a direction in which the exhaust gas flows.

6. The muffler unit according to claim 3, wherein the recesses are disposed inside the expansion chamber.

7. The muffler unit according to claim 2, wherein the inner cylinder is formed of a linear cylindrical pipe, and
the first outlet pipe is formed of a curved pipe connected with a downstream end of the linear cylindrical pipe and curved in a direction in which the exhaust gas flows.

8. The muffler unit according to claim 3, wherein the inner cylinder is formed of a linear cylindrical pipe, and
the first outlet pipe is formed of a curved pipe connected with a downstream end of the linear cylindrical pipe and curved in a direction in which the exhaust gas flows.

* * * * *